United States Patent
Jung

(10) Patent No.: US 7,086,741 B2
(45) Date of Patent: Aug. 8, 2006

(54) OPTICAL SYSTEM FOR A PROJECTOR AND A PROJECTION METHOD USING THE SAME

(75) Inventor: Myung-ryul Jung, Suwon (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 10/776,598

(22) Filed: Feb. 12, 2004

(65) Prior Publication Data

US 2004/0218152 A1    Nov. 4, 2004

(30) Foreign Application Priority Data

Feb. 13, 2003    (KR) ...................... 20-2003-0004252

(51) Int. Cl.
*G03B 21/00*    (2006.01)
*G03B 21/14*    (2006.01)

(52) U.S. Cl. .......................................... 353/69; 353/97
(58) Field of Classification Search ............ 353/69–70, 353/97, 99, 102; 348/746
See application file for complete search history.

(56) References Cited

U.S. PATENT DOCUMENTS

| 6,419,365 B1* | 7/2002 | Potekev et al. ............... 353/98 |
| 6,443,576 B1* | 9/2002 | Nishida et al. ............... 353/98 |
| 6,491,400 B1* | 12/2002 | Chen et al. .................... 353/70 |
| 6,517,210 B1* | 2/2003 | Peterson et al. ............ 353/102 |
| 2003/0107714 A1* | 6/2003 | Cheng ......................... 353/69 |

* cited by examiner

*Primary Examiner*—Christopher Mahoney
(74) *Attorney, Agent, or Firm*—Sughrue Mion, PLLC

(57) ABSTRACT

An optical system for a projector and a projection method. An optical system for a projector consistent with the present invention comprises a light source; a projection lens for externally projecting light incident from the light source; an image-forming panel disposed between the light source and the projection lens for modulating the light incident at a certain incident angle from the light source, forming an image, and reflecting the formed image onto the projection lens; and a light integrator disposed between the light source and the image-forming panel, wherein the light integrator transforms a cross-sectional face of the light, incident from the light source and radiated onto the image-forming panel at a certain incident angle, into a shape corresponding to the image-forming panel plane so that the cross-sectional face of the light has the same margin width around edges of the image-forming panel plane. Accordingly, an optical system consistent with the present invention can radiate a uniform amount of light onto the image-forming panel and maximize the radiation efficiency of a light source.

7 Claims, 9 Drawing Sheets

INPUT

OUTPUT
(PROJECTION SURFACE)

ROTATION AXIS

CROSS SECTION OF AN INTEGRATOR

INPUT

CORRECTED PROJECTION SURFACE

OUTPUT
(PROJECTION SURFACE)

OPTICAL SYSTEM FOR A PROJECTOR AND A PROJECTION METHOD USING THE SAME

CROSS-REFERENCE TO RELATED APPLICATIONS

This application claims the benefit of Korean Utility Application No. 2003-04252, filed on Feb. 13, 2003, in the Korean Intellectual Property Office, the disclosure of which is incorporated herein by reference in its entirety.

BACKGROUND

1. Field of the Invention

The present invention relates to an optical system for a projector using a digital mirror device, a projection method using the same and, more particularly, to an optical system using a modified light integrator capable of correcting the keystone phenomenon on light projected onto a digital mirror device panel, and a projection method using the same, wherein the keystone phenomenon refers to a phenomenon transforming an original shape on a projection surface due to the magnitude of an incident angle.

2. Description of the Related Art

A digital light processing ("DLP") projector, using a digital mirror device, generally eliminates the pixel mosaic problem of a liquid crystal display ("LCD") projector and delivers a higher contrast ratio so as to enhance original color reproducibility, thereby enabling highly bright, clear, and large color images to be obtained in, for example, presentations for use in businesses, schools, and advertisements, or in entertainment fields such as movies.

FIG. 1 is a schematic view showing a conventional optical system for a digital mirror device projector.

As shown in FIG. 1, a conventional digital mirror device projector has a light source 10; an ellipsoidal reflector 11 for reflecting and collecting beams emitted from the light source 10; a color filter wheel 12 for separating a white light collected from the ellipsoidal reflector 11 into red ("R"), green ("G"), and blue ("B") colors, and for illuminating the R, G, or B color, respectively, by one-third of the light per frame; a light integrator 13 for receiving light radiated, by color, from the color filter wheel 12, transforming the cross-sectional face of the output light into a predefined desired shape, and making the amount of light uniform; a lens group 14 for magnifying and radiating the light emitted from the light integrator 13; a reflection prism 15 for reflecting and radiating the light, by color, emitted from the lens group 14 to a digital mirror device panel 16 at a predetermined incidence angle (about 24 degrees), wherein the digital mirror device panel 16 is for adjusting a reflection angle, by pixel, and modulating an image formed by the light radiated from the reflection prism 15; and a projection lens 17 for projecting onto a screen 18 the image modulated by the digital mirror device panel 16.

The digital mirror device panel 16 is a combination of devices known as Micro Electro Mechanical ("MEM") systems, and is formed with pressure sensors, accelerometers, and micro actuators.

FIG. 2 is a perspective view showing a general structure of a reflector for a digital mirror device panel 16.

The digital mirror device panel 16 consists of a combination of Complementary Metal Oxide Semiconductor ("CMOS") cells of single crystal on a CMOS. Such a CMOS cell has an aluminum mirror 21 of about 16 μm² in area over it. Further, the aluminum mirror 21 can rotate about a rotation axis, depending upon the state of a basic memory cell, and can reflect light in one or two directions. Such rotations of the aluminum mirror 21 are made due to electrostatic attractions caused by voltage differences formed between the aluminum mirror 21 and the basic memory cell. When the memory cell is turned on, the aluminum mirror 21 rotates +12 degrees to reflect incident light inside the projection lens 17 and, when turned off, the aluminum mirror 21 rotates −12 degrees to reflect the incident light outside the projection lens 17.

In the conventional optical system described above, when output light formed from the light integrator 13 is projected on the digital mirror device panel 16, light incident from the reflection prism 15 is modulated and reflected to the projection lens 17 by the combination of respective aluminum mirrors 21 of the digital mirror device panel 16.

However, in the conventional optical system described above, if the light emitted from the reflection prism 15 becomes incident at, for example, 24° (that is twice the rotation angle of the aluminum mirror 21), when incident on the digital mirror device panel 16, the keystone phenomenon occurs in a direction vertical to the rotation axis of the aluminum mirror 21, causing the problem that the original shape of the cross-sectional face of the output light from the light integrator 13 is transformed.

FIG. 3A is a cross-sectional view of a conventional light integrator 13, and FIG. 3B is a view showing the shape of the light emitted from the light integrator 13 of FIG. 3A and projected onto the digital mirror device panel 16.

As shown in FIG. 3A and FIG. 3B, such transformation results in an insufficiency in the amount of light at corner portions of the digital mirror device panel 16, and causes the problem of lowering the radiation efficiency of the light emitted from the light source 10.

SUMMARY

To solve the above-described problems, it is an aspect of the present invention to provide an optical system for a digital mirror device projector capable of radiating an uniform amount of light onto a digital mirror device panel and of maximizing the radiation efficiency of a light source, and a projection method using the same.

To achieve the above-described aspect, in an optical system for a projector, an optical system for a digital mirror device projector consistent with the present invention comprises a light source; a projection lens for externally projecting light incident from the light source; an image-forming panel disposed between the light source and the projection lens for modulating the light incident at a certain incident angle from the light source, forming an image, and reflecting the formed image onto the projection lens; and a light integrator disposed between the light source and the image-forming panel, wherein the light integrator transforms a cross-sectional face of the light, incident from the light source and radiated onto the image-forming panel at a certain incident angle, into a shape corresponding to the image-forming panel plane so that the cross-sectional face of the light has the same margin width around edges of the image-forming panel plane.

Preferably, but not necessarily, the light integrator reduces the shape of the cross-sectional face of the radiated light in proportion to cos θ, with respect to its original shape in the direction of the keystone vector formed on the image-forming panel, when the incident angle of the light incident onto the image-forming panel is θ.

Further, the light integrator may be a light tunnel for transforming the cross-sectional face of the light collected from the light source into a predefined desired shape.

In addition, the image-forming panel may be a a digital mirror device panel having reflector arrays thereon.

Further, the digital mirror device panel may be arranged in order for the direction of the keystone vector formed on the digital mirror device panel to correspond to a direction vertical to the pivotal axes of the reflectors.

In order to achieve the above-described aspect, in a projection method for a projector having an image-forming panel forming an image, a projection method for a digital mirror device projector structured with a combination of reflectors having an image-forming panel forming images consistent with the present invention comprises the steps of: emitting and collecting light; receiving the collected light, transforming a cross-sectional face of the incident light into a predefined desired shape, and emitting the light onto the image-forming panel, wherein the cross-sectional face of the light is transformed by reduction in proportion to cos θ with respect to the direction of the keystone vector formed on the image-forming panel, when the incident angle of the light incident onto the image-forming panel is θ; radiating and modulating the emitted light, the cross-sectional face of which is transformed, onto the image-forming panel at the incident angle of θ; and magnifying and projecting the light forming the image.

BRIEF DESCRIPTION OF THE DRAWINGS

The above aspects and other features of the present invention will be readily apparent by describing, in detail, illustrative, non-limiting embodiments thereof with reference to the accompanying drawings, in which.

DETAILED DESCRIPTION OF THE ILLUSTRATIVE EMBODIMENTS

Figure 1:
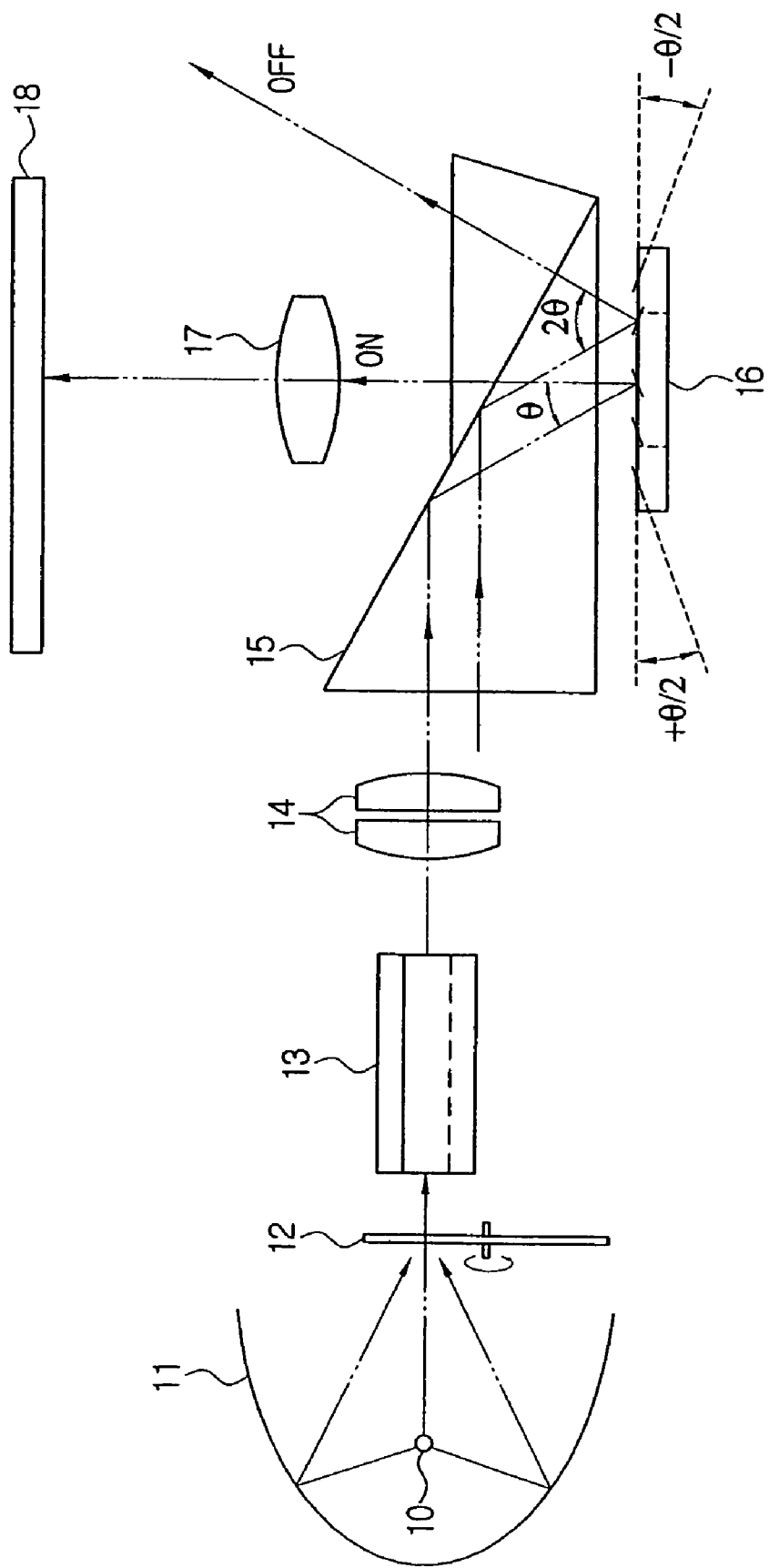
FIG. 1 is a schematic view showing a conventional optical system for a digital mirror device projector.
Figure 2:
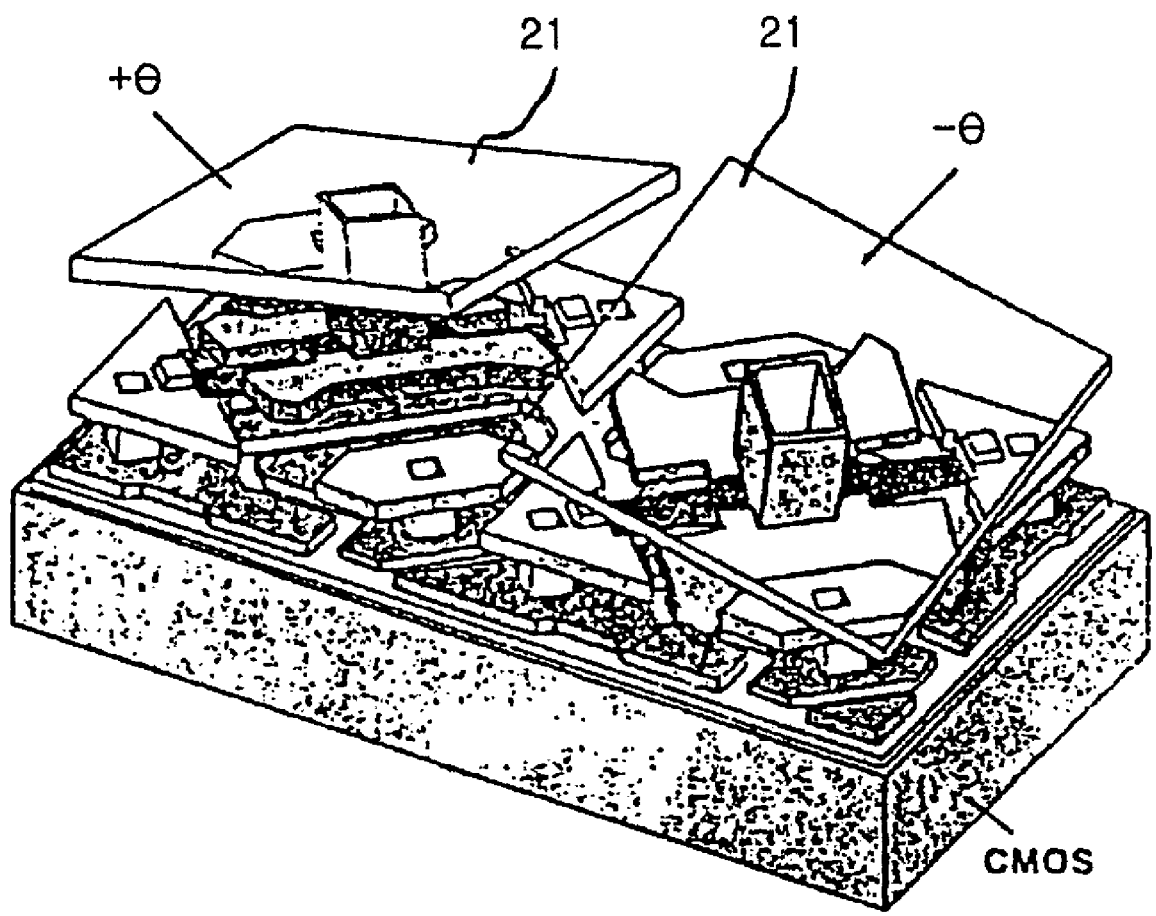
FIG. 2 is a perspective view showing a general structure for a reflector of a conventional digital mirror device panel.
Figure 3A:
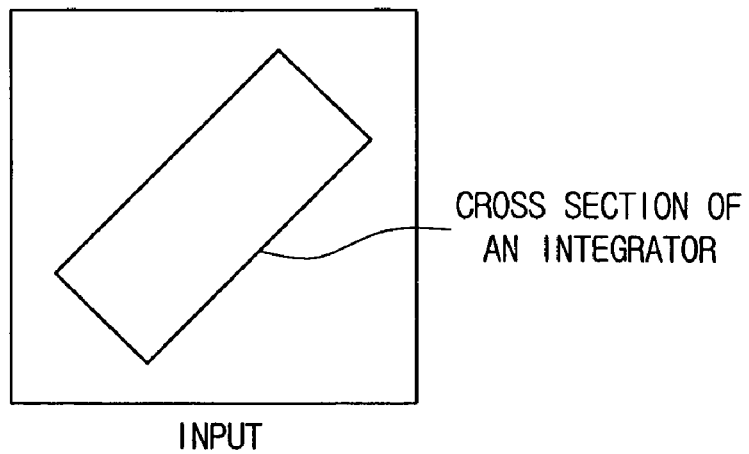
FIG. 3A is a cross-sectional view showing a conventional light integrator.
Figure 3B:
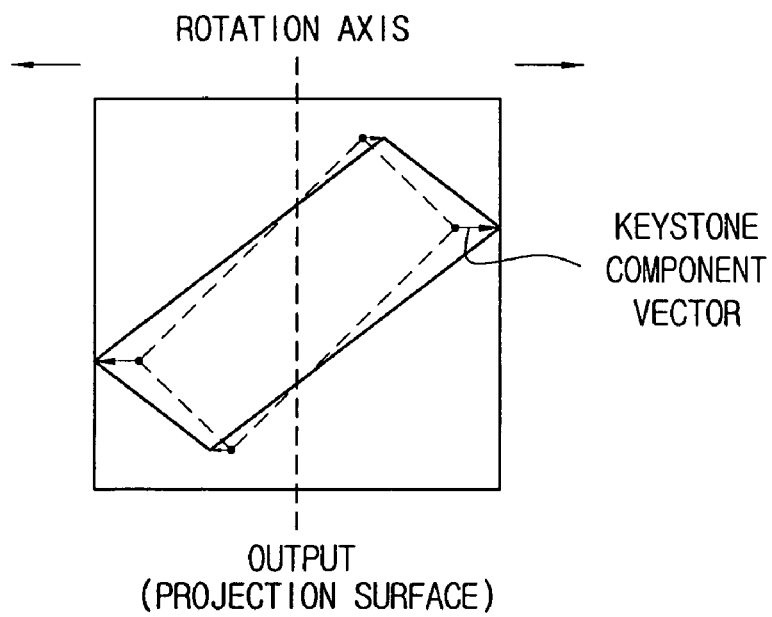
FIG. 3B is a view showing the shape of light emitted from the light integrator of FIG. 3A and projected onto a digital mirror device panel.

The present invention will now be described in detail by describing illustrative, non-limiting embodiments thereof with reference to the accompanying drawings. In the drawings, the same reference characters denote the same elements.

Figure 4:
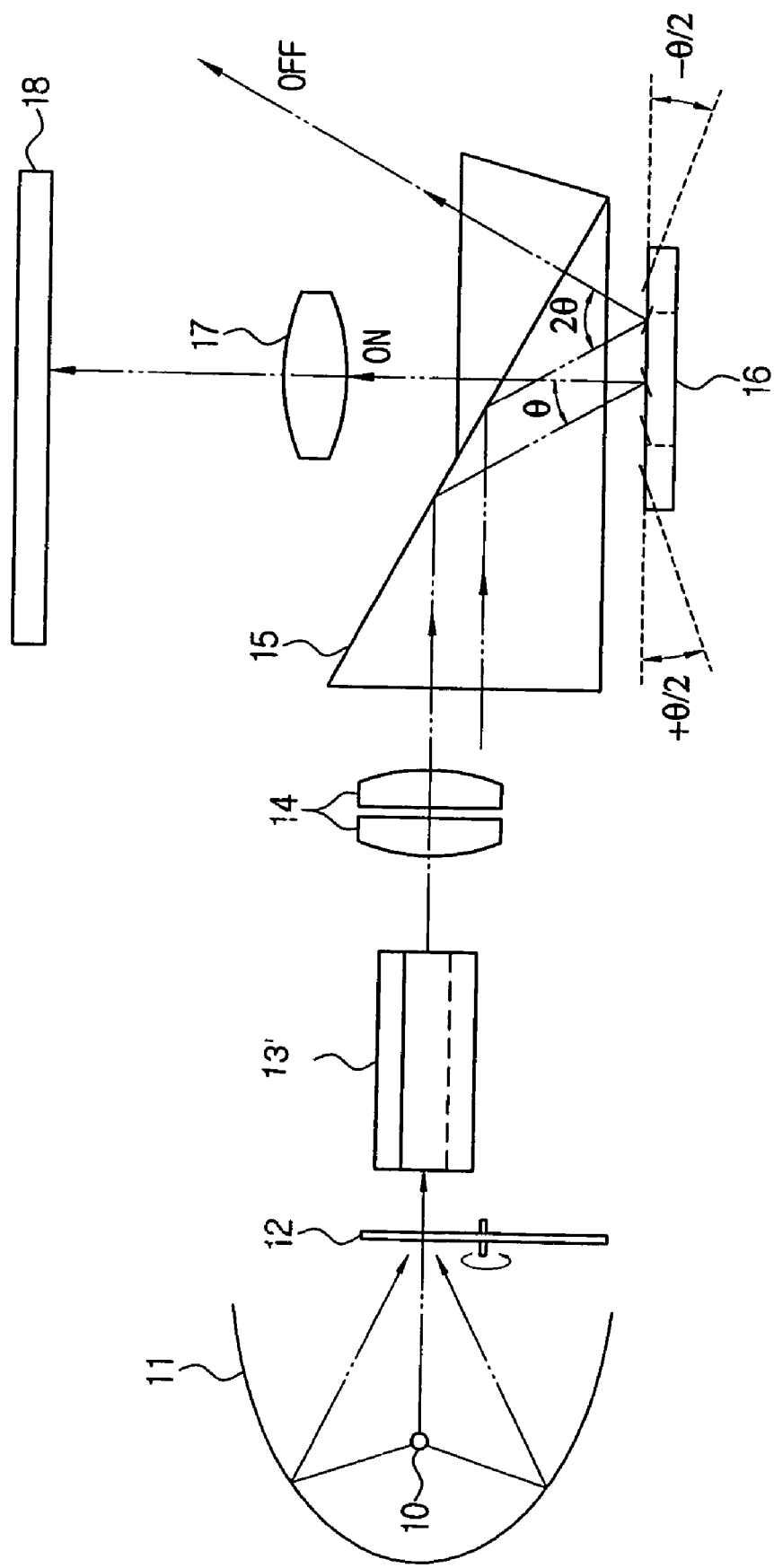
FIG. 4 is a schematic view showing an optical system for a digital mirror device projector consistent with the present invention.

Referring to FIG. 4, a first illustrative and non-limiting embodiment of the present invention uses a light tunnel, for example, as the light integrator 13'.

Figure 4A:
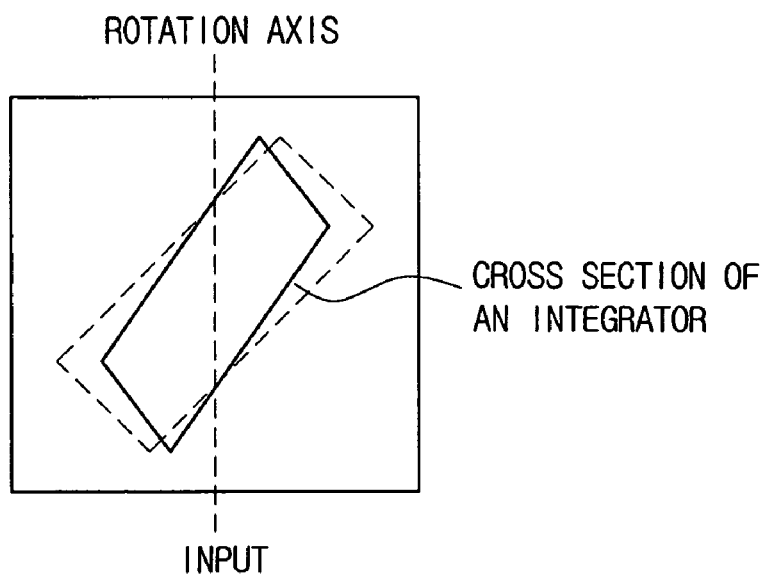
FIG. 4A is a cross-sectional view of a light integrator consistent with an illustrative and non-limiting embodiment of the present invention.
Figure 4B:
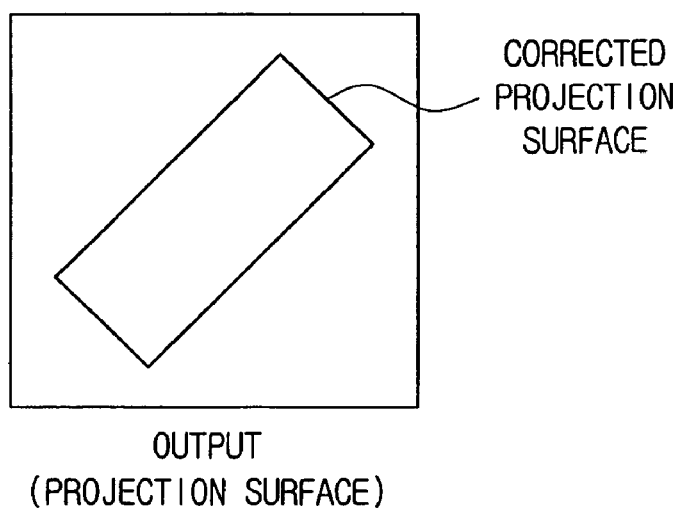
FIG. 4B is a view showing the shape of light emitted from the light integrator of FIG. 4A and projected onto the digital mirror device panel.

FIG. 4A is a cross-sectional view of a light integrator consistent with an illustrative and non-limiting embodiment of the present invention, and FIG. 4B is a view showing the shape of the light emitted from the light integrator and projected onto an image-forming panel, such as the digital mirror device panel 16.

Figure 5:
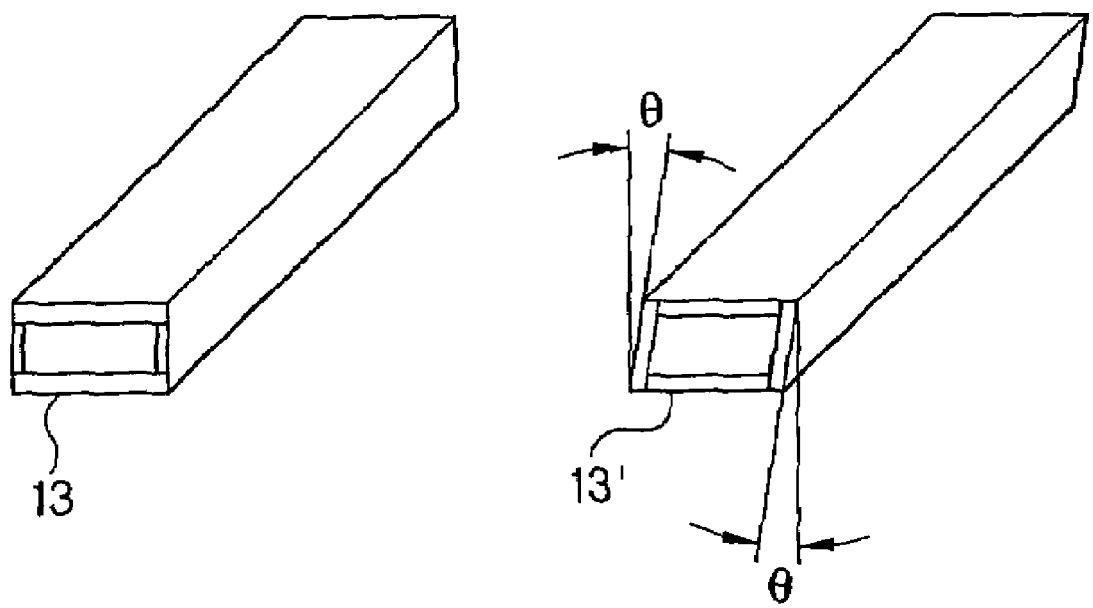
FIG. 5 illustrates the integrator 13 according to the prior art and the integrator 13' reduced in proportion to cos θ according to present invention.

As shown in FIG. 4 and FIG. 4A, when the incident angle of light incident onto the digital mirror device panel 16 is θ, a cross-sectional face of the light integrator 13' is reduced in proportion to cos θ with respect to a direction vertical to the rotation axis of the aluminum mirror 21, which is a reflector formed over the digital mirror device panel 16. FIG. 5 illustrates the integrator 13 according to prior arts and the integrator 13' reduced in proportion to cos θ according to present invention.

Furthermore, provided that a rotation angle of the aluminum mirror 21 formed over the digital mirror device panel 16 ranges from +12° to −12°, and 24°, for example, is given for an incident angle of light incident onto the digital mirror device panel 16, when the aluminum mirror 21 is turned on, the light-emitting angle is 0° with respect to the digital mirror device panel 16. Conversely, when the aluminum mirror 21 is turned off, the light-emitting angle is −24° with respect to the digital mirror device panel 16.

Accordingly, in the event that 24°, for example, is given for an incident angle of light incident onto the digital mirror device panel 16, the keystone phenomenon that occurs in a conventional optical system is proportional to 1.1, a value of arc-cos (24°).

However, in an optical system consistent with the present invention, using the light integrator 13', the original shape of the light is reduced in proportion to 0.9, a value of cos (24°), with respect to the direction vertical to the rotation axis of the aluminum mirror 21, so that, as shown in FIG. 4B, the keystone phenomenon is compensated for with respect to the incident light projected onto the digital mirror device panel 16.

Figure 5A:
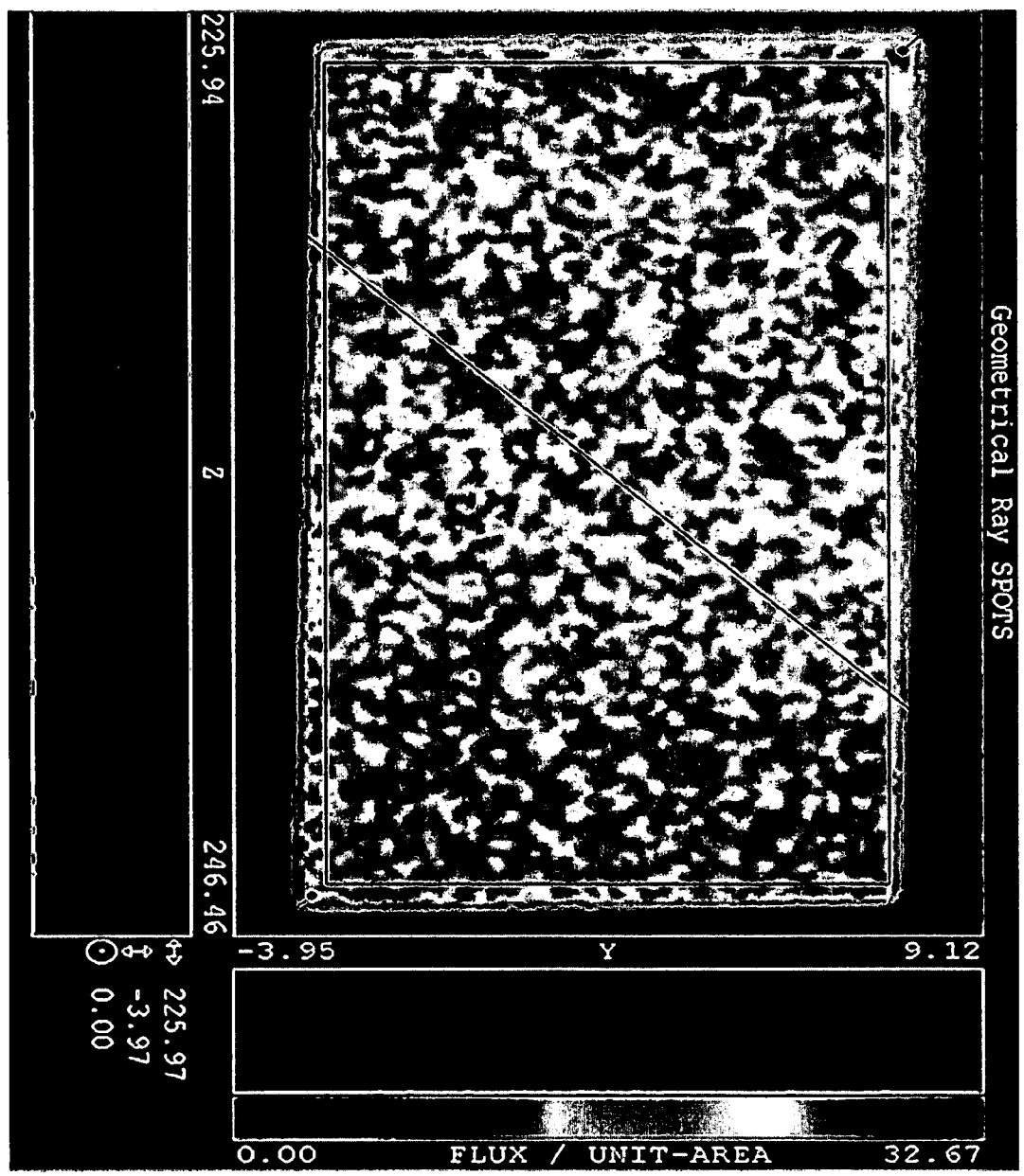
FIG. 5A is a view showing through simulation the shape of the light radiated on the digital mirror device panel according to the related art.
Figure 5B:
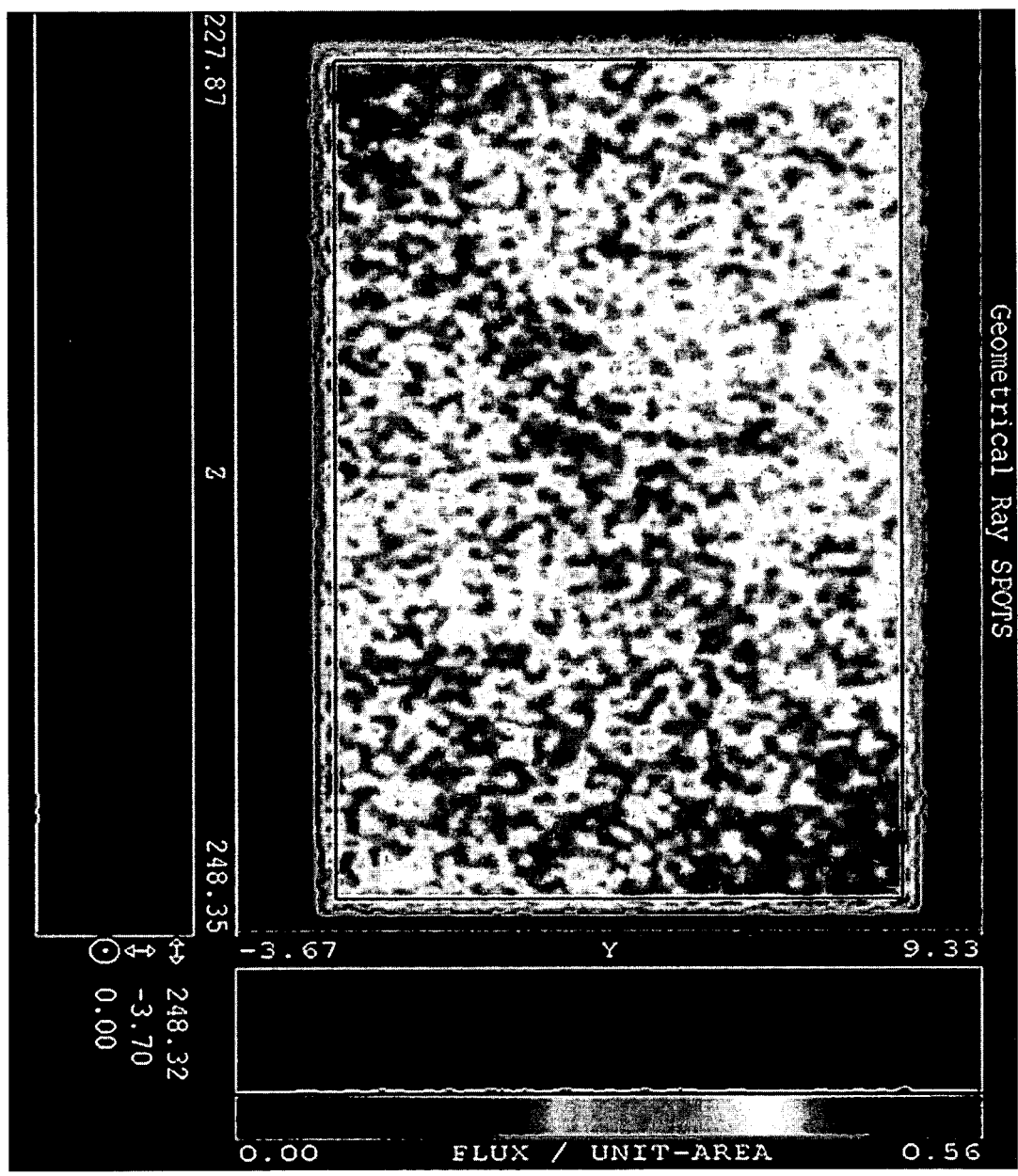
FIG. 5B is a view showing through simulation the shape of the light radiated onto the digital mirror device panel consistent with an illustrative and non-limiting embodiment of the present invention.

Referring to FIG. 5A and FIG. 5B, descriptions will be made in more detail through a comparison between simulations of illumination distribution states on the digital mirror device panel 16, which demonstrate, respectively, the keystone phenomenon occurring in the related art, and the keystone phenomenon as corrected by the present invention.

FIG. 5A is a view for showing through simulation the shape of light radiating onto a digital mirror device panel according to the related art, and FIG. 5B is a view for showing through simulation a shape of light radiating onto a digital mirror device panel consistent with the present invention.

As shown in FIG. 5A, the illumination state caused by radiation of light onto the digital mirror device panel 16, through an optical system according to the related art, shows the insufficiency in the amount of light on the upper right and lower left portions of the digital mirror device panel 16, and the redundancy of the amount of light on the upper left and lower right portions of the digital mirror device panel 16.

In contrast, as shown in FIG. 5B, the illumination state caused by the radiation of light onto the digital mirror device panel 16, through an optical system consistent with the present invention, shows a uniform margin width of light radiated on the upper left, upper right, lower left, and lower right portions of the digital mirror device panel 16, respectively, so that the radiation efficiency of the light source 10 can be maximized with the margin width of light narrower.

Hereinafter, a projection method for a digital mirror device projector consistent with the present invention will be described in brief.

Figure 6:
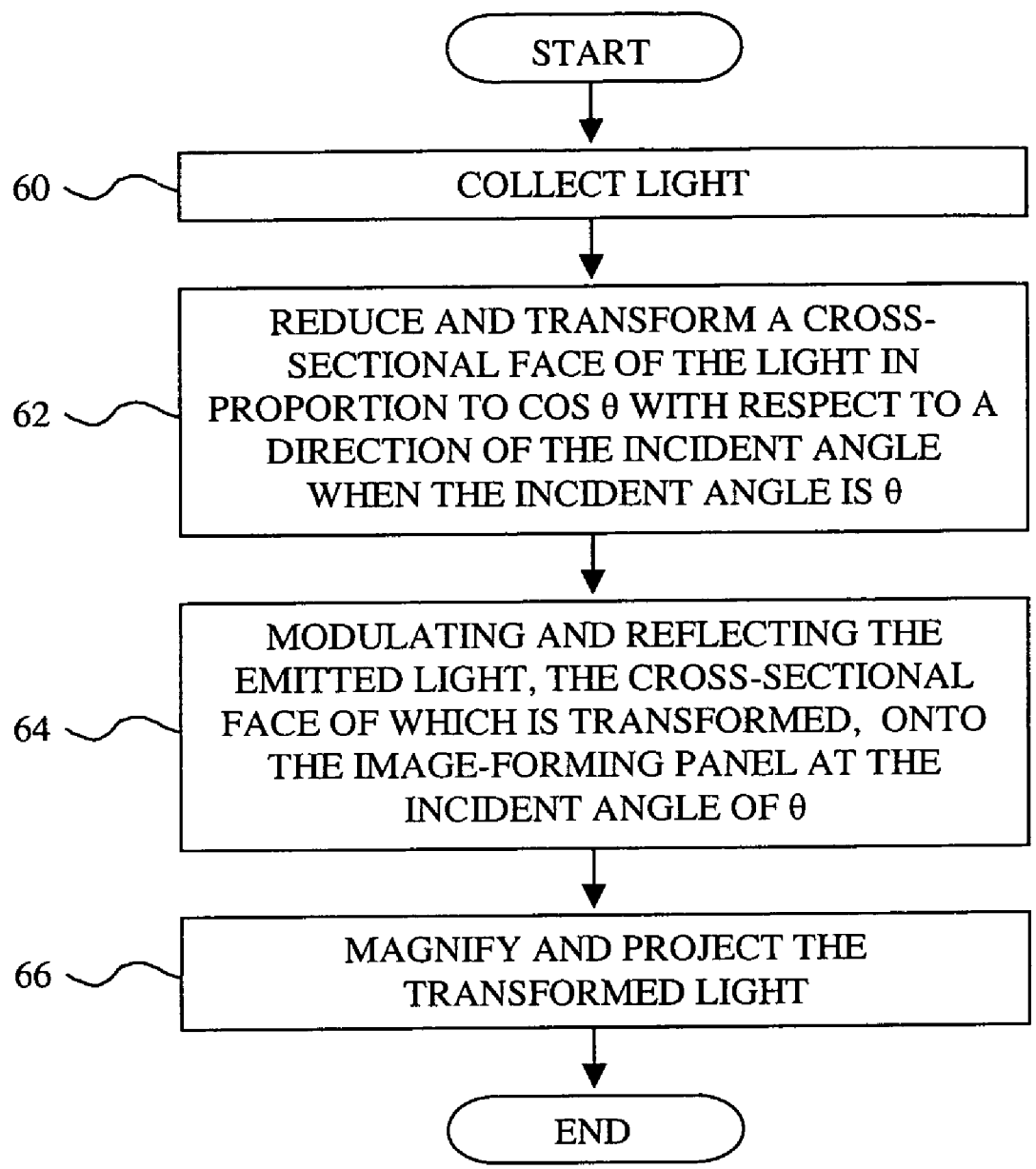
FIG. 6 is a flowchart showing a projection method for a digital mirror device projector consistent with the present invention.

Referring to FIG. 4 and FIG. 6, first, the method has a step 60 of collecting light emitted from the light source 10.

A next step 62 for the method receives the collected light and transforms a cross-sectional face of the light to be emitted into a predefined desired shape, wherein the cross-sectional face of the light is transformed by a reduction in proportion to cos θ with respect to a direction of the incident angle of the cross-sectional face of the light, when the incident angle of the light incident onto the digital mirror device panel 16 is θ.

Thereafter, in step 64, the emitted light, the cross-sectional face of which is transformed, is modulated and reflected onto the digital mirror device panel 16 at the incident angle θ.

Lastly, a step 66 magnifies and projects the modulated light.

The above description has been made of an illustrative and non-limiting embodiment using a light tunnel as the light integrator 13', but other various items such as a pipe, or a rod, and so on, rather than the light tunnel, can be applied as the light integrator 13' consistent with the present invention.

An optical system for a digital mirror device projector and a projection method therefor consistent with the present invention can radiate an uniform amount of light onto the digital mirror device panel, with uniform margin widths of the light amount, and can maximize the radiation efficiency of a light source.

The above and other features of the invention including various and novel details of construction and combination of parts has been particularly described with reference to the accompanying drawings and pointed out in the claims. It will be understood that the particular construction and combination of parts embodying the invention is shown by way of illustration only and not as a limitation of the invention. The principles and features of this invention may be employed in varied and numerous embodiments without departing from the scope of the invention.

What is claimed is:

1. An optical system for a projector, comprising:
   a light source;
   a projection lens for externally projecting light incident from the light source;
   an image-forming panel disposed between the light source and the projection lens, and for modulating the light incident at a certain incident angle from the light source, forming an image, and reflecting the formed image onto the projection lens; and
   a light integrator disposed between the light source and the image-forming panel, wherein the light integrator transforms a cross-sectional face of the light, incident from the light source and radiated onto the image-forming panel at a certain incident angle, into a shape corresponding to the image-forming panel plane so that the cross-sectional face of the light has the same margin width around edges of the image-forming panel plane;
   wherein the light integrator reduces the shape of the cross-sectional face of the light, which is incident from the light source and which is radiated onto the image-forming panel at a certain incident angle, in proportion to cos θ with respect to the original shape of the cross-sectional face of the light in the direction of a keystone vector formed on the image-forming panel;
   wherein the incident angle of the light incident onto the image-forming panel is θ;
   wherein the light integrator comprises a parallelogram shaped cross-sectional face, wherein a width of the cross-sectional face in the direction of the keystone vector is configured to be reduced as a result of multiplying an original width of the cross-sectional face by a value of cos θ.

2. The optical system as claimed in claim 1, wherein the light integrator comprises a light tunnel for transforming the cross-sectional face of the light collected from the light source into a predefined desired shape.

3. The optical system as claimed in claim 1, wherein the image-forming panel is a digital mirror device panel having reflector arrays thereon.

4. The optical system as claimed in claim 3, wherein the digital mirror device panel is arranged so that the direction of the keystone vector formed on the digital mirror device panel corresponds to a direction vertical to the pivotal axes of the reflectors.

5. The optical system as claimed in claim 1, wherein the light integrator comprises a pipe for transforming the cross-sectional face of the light collected from the light source into a predefined desired shape.

6. The optical system as claimed in claim 1, wherein the light integrator comprises a rod for transforming the cross-sectional face of the light collected from the light source into a predefined desired shape.

7. A projection method for a projector having an image-forming panel forming images, comprising:
   emitting and collecting light;
   receiving the collected light, transforming a cross-sectional face of the incident light into a predefined desired shape, and emitting the light onto the image-forming panel, wherein the cross-sectional face of the light is transformed by reduction in proportion to cos θ with respect to the direction of the keystone vector formed on the image-forming panel, when the incident angle of the light incident onto the image-forming panel is θ;
   radiating and modulating the emitted light, the cross-sectional face of which is transformed, onto the image-forming panel at the incident angle of θ; and
   magnifying and projecting the light forming the image.

* * * * *